United States Patent
Enbom et al.

(10) Patent No.: US 7,453,897 B2
(45) Date of Patent: Nov. 18, 2008

(54) NETWORK MEDIA PLAYOUT

(75) Inventors: Niklas Enbom, Stockholm (SE);
Fredrik Galschiodt, Stockholm (SE)

(73) Assignees: Global IP Solutions, Inc., San Francisco, CA (US); Global IP Solutions (GIPS) AB, Stockholm (SE)

( * ) Notice: Subject to any disclaimer, the term of this patent is extended or adjusted under 35 U.S.C. 154(b) by 1114 days.

(21) Appl. No.: 10/262,531

(22) Filed: Sep. 30, 2002

(65) Prior Publication Data

US 2003/0091160 A1 May 15, 2003

Related U.S. Application Data

(60) Provisional application No. 60/327,177, filed on Oct. 3, 2001.

(51) Int. Cl.
*H04L 12/28* (2006.01)

(52) U.S. Cl. .................. 370/412; 370/413; 370/415; 370/417

(58) Field of Classification Search .............. None
See application file for complete search history.

(56) References Cited

U.S. PATENT DOCUMENTS

| | | | |
|---|---|---|---|
| 5,297,139 A | | 3/1994 | Okura et al. |
| 5,825,771 A * | | 10/1998 | Cohen et al. ............... 370/394 |
| 5,889,764 A * | | 3/1999 | Needham et al. ........... 370/263 |
| 6,151,634 A * | | 11/2000 | Glaser et al. ............... 709/236 |
| 6,366,959 B1 * | | 4/2002 | Sidhu et al. ................ 709/231 |
| 6,512,761 B1 * | | 1/2003 | Schuster et al. ............ 370/352 |
| 6,625,656 B2 * | | 9/2003 | Goldhor et al. ............ 709/231 |
| 6,658,027 B1 * | | 12/2003 | Kramer et al. .............. 370/516 |
| 6,665,751 B1 * | | 12/2003 | Chen et al. ................... 710/52 |
| 6,775,301 B1 * | | 8/2004 | Kroll et al. .................. 370/516 |
| 6,912,224 B1 * | | 6/2005 | Duault et al. ................ 370/412 |
| 6,977,942 B2 * | | 12/2005 | Raisanen .................... 370/429 |
| 6,977,948 B1 * | | 12/2005 | Chennubhotla et al. ..... 370/516 |
| 7,161,905 B1 * | | 1/2007 | Hahn et al. ................. 370/231 |
| 7,373,413 B1 * | | 5/2008 | Nguyen et al. ............. 709/231 |
| 2001/0000540 A1 * | | 4/2001 | Cooper et al. ............... 711/104 |
| 2002/0172352 A1 * | | 11/2002 | Mecayten ............... 379/406.01 |
| 2007/0206645 A1 * | | 9/2007 | Sundqvist et al. ........... 370/516 |

FOREIGN PATENT DOCUMENTS

| | | |
|---|---|---|
| WO | WO 95/22233 A1 | 8/1995 |
| WO | WO 96/15598 A1 | 5/1996 |
| WO | WO 01/93516 A1 | 12/2001 |

* cited by examiner

*Primary Examiner*—Phirin Sam
(74) *Attorney, Agent, or Firm*—Townsend and Townsend and Crew LLP

(57) ABSTRACT

According to the invention, a method for processing an audio media stream that originates from a packet communication network is disclosed. In one step, packets are received as they arrive from the packet communication network. The packets are part of the audio media stream. A playout buffer in a media playout device is monitored. It is determined that the playout buffer is filled below a threshold. A portion of the audio media stream is retrieved when the playout buffer is filled below the threshold. The portion is stored in the playout buffer of the media playout device.

28 Claims, 4 Drawing Sheets

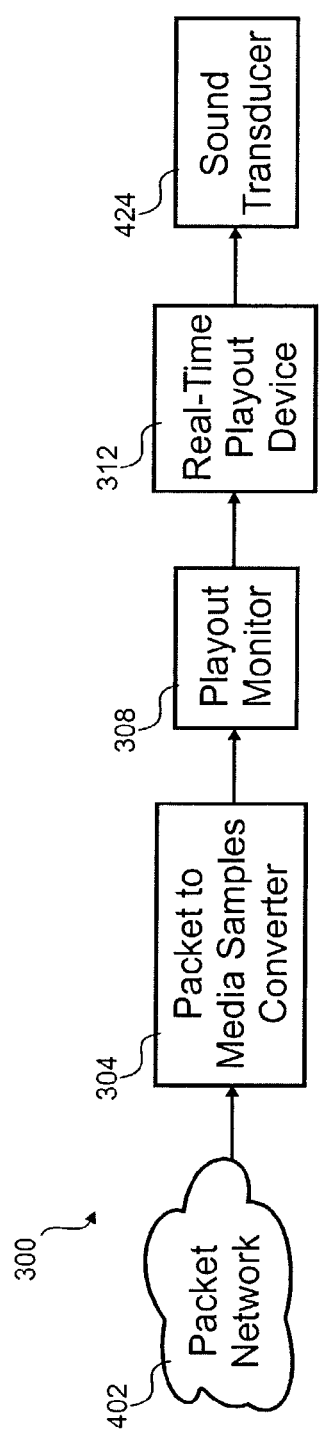
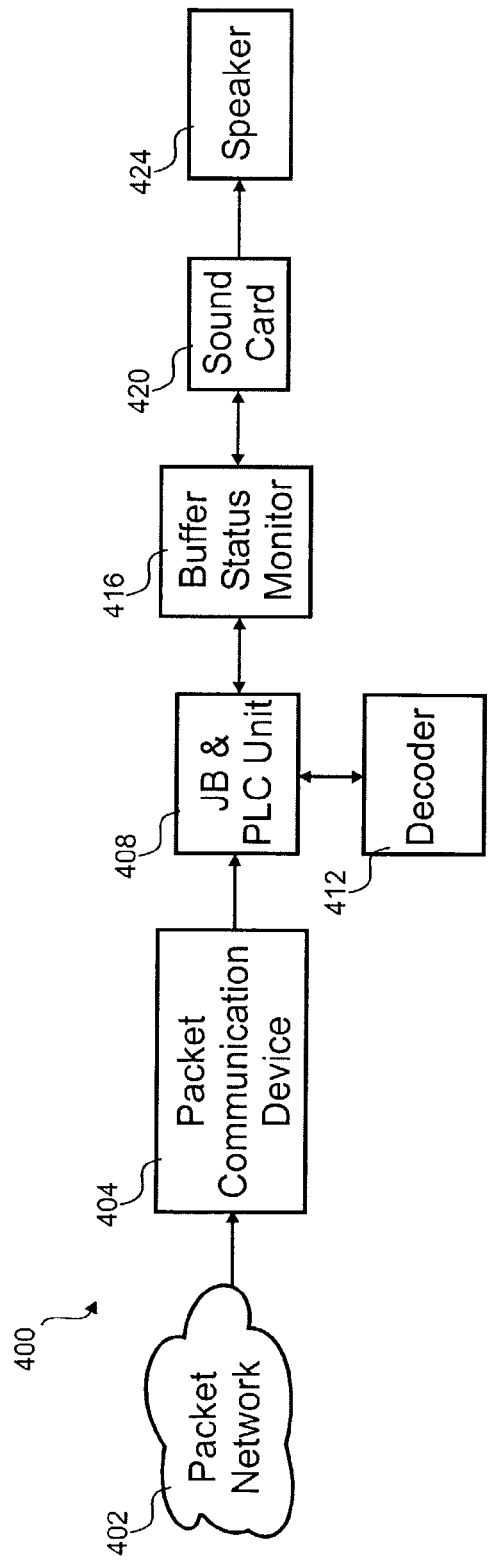

NETWORK MEDIA PLAYOUT

This application claims the benefit of and is a non-provisional of U.S. application Ser. No. 60/327,177 filed on Oct. 3, 2001, which is incorporated herein by reference.

BACKGROUND OF THE INVENTION

This invention relates in general to real-time media playout and, more specifically, to computer media playout of network provided media.

The receiver part of a packet communication device is characterized by having as input an asynchronous flow of data packets. A real time media playout device needs to produce a continuous output of data, e.g., to a loudspeaker. Furthermore, for a real time application such as telephony, streamed audio, or streamed video it is important that the delay is minimized and therefore the delay in the receiver and the playout device should be as small as possible.

The real-time media device is defined as the software and/or hardware that convert the digital media signal to a signal suitable for playout, for example an analog signal that can be fed into a speaker. In a computer the real-time media device is usually referred to as a sound card or sound board when the media is sound and a video card or video board when the media is video. The packet communication device is usually referred to as a network adaptor, which in a computer could be a network card or a modem.

The quality of media playout is a subjective standard and is an important part of achieving high Quality of Service (QOS). The incoming packets from the network are characterized by at least three factors that affect the playout quality and the QOS, namely, latency, clock drift and packet loss. Latency is a measure of how the packets are delayed in the network. This delay can vary from packet to packet. These variations are referred to as jitter. Clock drift is when the incoming packets arrives at a pace that does not represent the pace of the playout by the playout device. Packet loss is when not all of the packets that represent the media stream are received for playout. Real-time media playout with adequate QOS maintains a high perceptual quality to the user. That also includes having low delay, to ensure high quality real time communication.

A prior art receiver used in a state of the art real time communication system over packet networks consists of: a jitter buffer, a decoder, a packet loss concealment unit, and a real time media playout device. The jitter buffer accumulates packets to mitigate the effects of jitter and reorders the received packets, if necessary, so that the packets can be taken out of the buffer with regular intervals in proper temporal order. The decoder converts the digital information in the packets into a media signal that can be fed to the playout device. The packet loss concealment (PLC) unit produces a media signal when a packet is lost (i.e., the packet is not available in the jitter buffer). For example in sound playout, one simple packet loss concealment technique is to replace the missing packets with zeros. This technique is usually referred to as zero-stuffing. The real time media playout device (e.g., a sound card or other audio device on a computer) typically has a buffer and a digital to analog (D/A) converter.

With reference to FIG. 1, a simple transmitter and a simple receiver are respectively shown as Side A and Side B. The simple receiver consists of a packet communication device, a decoder and a real time media device for playout to a loudspeaker. As soon as a packet arrives from the packet network the packet communication device will send it to the decoder that decodes it and sends it to a buffer in the real time media device. The real time media device converts the audio from digital to analog and sends the analog signal to the loudspeaker. This playout design suffers from a loss in perceptual quality because there is no mechanism to mitigate jitter and reordering and there is no packet loss concealment unit.

Also, if the simple receiver does not have the same frequency as the simple transmitter there will be a mismatch sometimes referred to as "clock drift". For example, assume that the simple transmitter uses frequency fsA Hz and the simple receiver uses frequency fsB Hz and that fsB>fsA. This means that the simple transmitter records fsA samples per second and that the simple receiver plays out fsB samples per second. Since fsB>fsA in our example that will cause the buffer in the simple receiver to run out of media to playout presuming the recording is done in real time. This discontinuity will have the same effect as having packet losses where zero-stuffing is used as the concealment method.

Referring next to FIG. 2, a more advanced receiver is shown that consists of a packet communication device, a jitter buffer, a decoder and a real time media device for playout to a loudspeaker. Side A is not shown in relation to FIG. 2, but is the same as Side A shown in FIG. 1. As soon as a packet arrives from the Internet protocol (IP) network the packet communication device places it in the jitter buffer that reorders the packet if necessary. A timer decides when to extract a packet from the jitter buffer and decode it. This timer is set to trigger at the same time interval as the packet size. When the packet is decoded it is put in the real time media device's buffer. If no packet is present in the jitter buffer when the timer is triggered then packet loss concealment is performed and the data produced is put in the real time media device's buffer. The real time media device converts the audio signal from being digital to analog and sends the analog signal to the loudspeaker.

This more advanced playout method will correct the problem of reordered packets and may have a more advanced packet loss concealment method than zero-stuffing. But since the timer for the call to the jitter buffer is not synchronized with the clock in the real time media device it will be a mismatch so that it will still suffer from "clock drift". If the timer is "faster" than the clock in the real time media device the buffer in the real time media device is filled faster than it manages to playout and the delay increases over time. If on the other hand, the playout is faster than the timer then the buffer will run out of media to playout, i.e., it will underrun. The underrun will sound like packet loss with zero-stuffing as the packet loss concealment method. This problem is caused by the fact that two clocks are used; one for the interaction with the packet network, jitter buffering and decoding and one for the real time media device.

One solution for this problem could be to use one clock for all processes, like on a DSP, but this is not practical with PCs where the central processing unit handles the interaction with the packet network, jitter buffering and decoding and the sound card handles D/A-conversion. But this is not the only inaccuracy that will cause "clock drift," as explained in relation to FIG. 1 above. If for some reason the CPU clock and the sound card clock were to be perfectly synchronized the different sampling rates on side A and side B as can be seen in the example of FIG. 1 would cause the jitter buffer to either run out of data or get filled up. The first scenario explained in relation to FIG. 1 would happen if fsA>fsB and the second scenario explained in relation to FIG. 2 would happen if fsA<fsB.

BRIEF DESCRIPTION OF THE DRAWINGS

The present invention is described in conjunction with the appended figures:

FIG. 3 is a block diagram of an embodiment of a content receiver;

FIG. 4 is a block diagram of an embodiment of a content receiver;

Figure 1A:
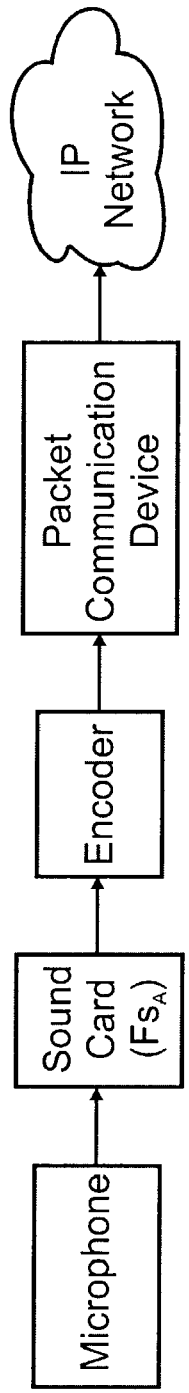
FIG. 1 is a prior art block diagram of a simple transmitter and a simple receiver that respectively record and playout an audio stream.

In the appended figures, similar components and/or features may have the same reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention provides a system and method for improving playout of media streamed from a packet switched network. The buffer of the media playout device is monitored such that continuous playout of media is largely guaranteed. This is achieved by comparing the amount of media in the buffer with a threshold. Once the amount of data is less than the threshold, data is requested from the jitter buffer. The jitter buffer either has data that it passes to the decoder or a packet loss concealment operation is performed to create data. The data produced is then put in the real time media playout device's buffer. So the status of the buffer is used to trigger loading more media samples into that buffer. The delay associated with the jitter buffering and packet loss correction is kept within a range that provides adequate QOS.

In one embodiment, the present invention provides a method for processing an audio media stream that originates from a packet communication network. In one step, packets are received as they arrive from the packet communication network. The packets are part of the audio media stream. A playout buffer in a media playout device is monitored. It is determined that the playout buffer is filled below a threshold. A portion of the audio media stream is retrieved when the playout buffer is filled below the threshold. The portion is stored in the playout buffer of the media playout device.

In another embodiment, the present invention provides an audio playback system coupled to a packet communication network for playing a media stream as that media stream is received. The audio playback system includes a packet communication device, a first buffer, a media playout device, and a buffer status monitor. The packet communication device receives packets from the packet communication network. The first buffer stores the packets. The media playout device plays the media stream from a second buffer. The buffer status monitor determines when the second buffer is filled below a threshold before requesting more of the media stream from the first buffer.

In yet another embodiment, the present invention provides a method for processing a media stream that originates from a packet communication network. In one step, packets are received as they arrive from the packet communication network. The packets are part of the media stream. The packets are stored in a first buffer. A second buffer used by a media playout device is monitored. It is determined that the second buffer is filled below a threshold. A portion of the media stream is received from the first buffer, at least partially in response to the second buffer being filled below a threshold. The portion is stored in the second buffer of the media playout device.

Figure 1B:
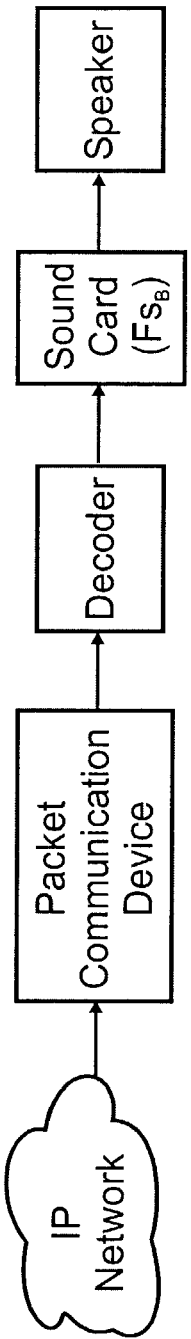

Referring first to FIG. 3, a block diagram of a content receiver 300 is shown that includes a packet to media samples converter 304, a playout monitor 308 and a real time media playout device 312. Compared to the simple and advanced receivers described in the Background Section, the playout monitor 308 is included. This playout monitor 308 manages the state of a buffer in the playout device 312 and detects when more data is needed for playout. In contrast, the simple receiver of FIG. 1 determines the playout rate from incoming packets and the advanced receiver of FIG. 2 determines the playout rate from a timer. The packet to media samples converter 304 provides media samples when requested by the playout monitor 308, even when the IP packets are delayed or lost. The perceptual quality of the played media samples are affected by the packet stream from the network 402 and by the performance of the packet to media samples converter 304.

With reference to FIG. 4, a block diagram of an embodiment of a content receiver 400 is shown that controls the playout of a voice over Internet protocol (VOIP) stream. The method is implemented on a PC running, Microsoft™ Windows as an operating system, for example. Included in the content receiver 400 are a packet communication device 404, a combined jitter buffer (JB) and a packet loss concealment (PLC) unit, a voice decoder 412, a buffer status monitor 416, a sound card 420, and a loudspeaker 424. The different elements of the content receiver are described below.

The packet communication device 404 interfaces with the IP network 402 and extracts the media out of the packets that are received from the IP network 402. The JB & PLC unit 408 reduces the distortions of network transmission such as packet loss, jitter and delay to maximize the perceptual quality of the media samples. Important to notice is that this JB & PLC unit 408 tries to keep a minimum of packets in the buffer. The amount of packets in the buffer at any time instant is based on statistics of the incoming packet stream. When the JB & PLC unit 408 is requested to produce data, it determines whether there is data in the buffer or not. If there is data in the buffer, it is decoded when available or a packet loss concealment operation is performed to produce data. The voice decoder 412 decompresses the audio stream.

For example, the sound card may record audio samples using 16 bits per sample. Using an audio encoder according to the G.711-standard, this stream is compressed to 8 bits per sample. At the receiver 400, the 8 bits per sample stream is decompressed by the decoder 412 and the output is a 16 bit per sample audio stream. Decoding converts the transmitted bit stream to a bit stream that the sound card 420 can understand which could include conversion of formats, bit size of each sample, or sample rates. The real time playout device 312 in this embodiment is a PC sound card 420 connected to a speaker 424, stereo equipment, headphones, etc. The playout monitor 308 functionality of FIG. 3 is performed in buffer status monitor 416 with software that tracks the sound card playout status and writes data from the JB & PLC unit 408 to the sound card buffer when needed. This embodiment of the software is driven by a timer function provided by the operating system that could be a software or hardware timer.

The content receiver 400 can be seen as three different parts, of which, one part is interconnecting two separately executing parts. The interconnecting block is the combined JB & PLC unit 408 and the two separately executing ones are the packet communication device 404 and the buffer status monitor 416. The packet communication block places the arriving packet in a jitter buffer (inside the JB & PLC unit 408) as soon as it has arrived from the packet network 402. Independently of this, a timer in the buffer status monitor 416 decides when to check the status of the sound card buffer. If the amount of data in this sound card buffer is above a specific threshold nothing is done. If on the other hand the amount of data in the sound card buffer is below the threshold, data is requested from the JB & PLC unit 408. If there is data in the jitter buffer, it is either decoded or a packet loss concealment operation is performed to produce data. The data is thereafter put in the sound card buffer 420 by the buffer status monitor 416. The above mentioned threshold can be adaptive to cope with, for example, unreliable operating system timers and inaccurate playout status reports from sound card 420.

In this embodiment, the target of the adaptation should have as low a threshold as is possible without suffering from playout underruns. The risk of underrun might vary with system temporal accuracy and system load, so these and other factors will affect how low the threshold should be set. Trial and error could be used in some cases to determine the threshold for various hardware and software configurations. In some embodiments, the number of underruns could be monitored and the threshold adjusted accordingly. A threshold set needlessly low will risk underruns, and a threshold set needlessly high increases delay.

The timer interval triggers the buffer status monitor 416 to check the sound card buffer. This interval timer has some design considerations. The first is that the timer interval is smaller than a playback time of the amount of media that is normally requested from the JB & PLC unit 408 and placed in the sound card buffer. The second design consideration is that the timer interval is less than the time it takes for the sound card 420 to playout the amount of data received from the JB & PLC unit 408. For example, when a request of media from the JB & PLC unit 408 returns a 10 ms block of sound, the interval timer should trigger the buffer status monitor 416 to check the sound card buffer more often than every 10 ms. If the interval timer where to be executing more seldom than every 10 ms the buffer in the sound card would eventually run out of media. A low timer interval prevents underruns, but can unnecessarily load the system. With a block size of 10 ms, a timer interval in the range of 2-5 ms could be used in various embodiments.

Figure 2:
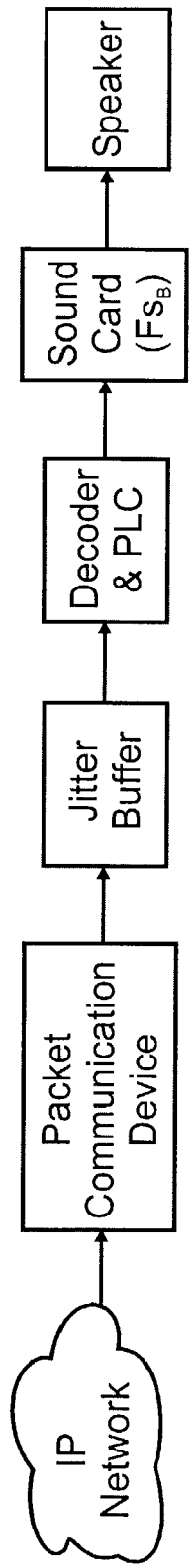
FIG. 2 is a prior art block diagram of an advanced receiver.

As explained above in relation to the examples of FIG. 1 and FIG. 2, different sampling rates at the simple transmitter and simple receiver and/or different clocks used for jitter buffering and sound card playout causes "clock drift" problems. In contrast, the embodiment of FIG. 4 is not affected by these kinds of problems because of the combination of a unique combined JB & PLC unit 408 and an independent function monitoring the status of the sound card buffer and requesting more media only when needed by the sound card buffer. The buffer status monitor 416 compares the amount of media in the sound card buffer with a threshold. If the amount of media is less than the threshold, more data is requested from the JB & PLC unit 408 and written to the sound card buffer. In this embodiment, the threshold amount in the sound card buffer is 50 ms of buffered sound waiting for playback. In other embodiments, the range of this threshold could be 25-150 ms. Thus, this mechanism ensures that there is always media to playout in the sound card buffer but it also ensures that there is never more media in the sound card buffer than the threshold plus the block size. So the two problems underruns and the sound card buffer being filled more and more, described in relation to FIG. 2, are thereby avoided.

In some embodiments, the threshold of data in the sound card buffer that triggers reading another block from the jitter buffer could be an adaptive threshold. A threshold trigger set too high will tend to increase delay and a threshold trigger set too low will tend to produce underruns where sound card buffer is emptied. An underrun can be detected in a number of ways, such as with status from the sound card or by monitoring the output of the sound card if the sound card supports that feature. In an embodiment with an adaptive threshold, the threshold trigger is initially set to a high value. If there is an underrun, the threshold trigger is raised. If there is no underrun, it is successively lowered until there is an underrun. When an underrun is detected, the threshold trigger is raised and will not be successively lowered again. If the raised threshold still causes an underrun, it will be raised again. Once a threshold trigger is adaptively found and works reliably without underrun for a period of time, that value may be saved for future use with this computer. Periodically, the threshold trigger may be tested to determine if the computer can now tolerate a lower threshold trigger.

Since the monitoring buffer status function 416 only delivers media to the sound card when needed the JB & PLC unit 408 will be receiving more or less media than what it is delivering to the sound card depending on the mismatch of sampling rates between the sender and receiver. The combined JB & PLC unit 408 is therefore designed to be able to modify the amount of media produced from the received packets based on the playout rate. For example, extra samples can be produced at-any time where theris inadequate data in the JB to satisfy a threshold-triggered request for a data block. This unique property is used to prevent the JB from getting filled with data or running out of data with only a small perceptual degradation associated with recreation of the missing samples. So the combined JB & PLC unit 408 always delivers data when requested and tries to minimize the buffer size at the same time by not recreating missing samples until they are actually requested. The above design is therefore independent of clocks and sampling rates that might differ between the sender of packetized audio and the receiver of that packetized audio.

Figure 5:
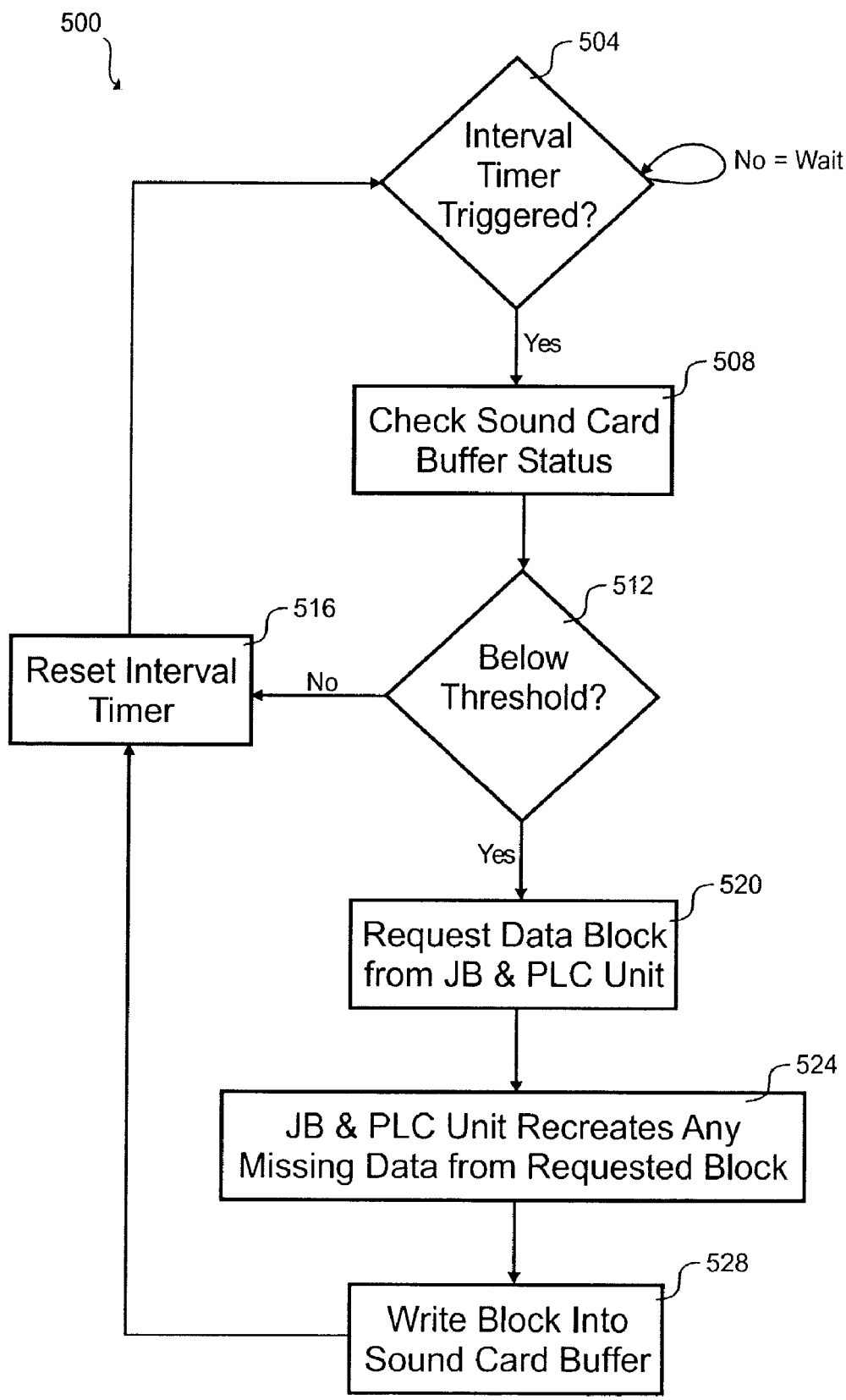
FIG. 5 is a flow diagram of an embodiment of a process for feeding data into a playout device.

With reference to FIG. 5, a flow diagram of an embodiment of a process 500 for feeding data into a playout device is shown. A timer interval is configured for by using a hardware or software timer of the computer executing this process. In this embodiment, the timer interval is 3 ms. In step 504, the repetitive process 500 begins once the interval timer has lapsed. The sound card 420 is queried in step 508 to determine the status the sound card buffer. A minimum amount in the sound card buffer serves as a threshold to request additional data from the JB & PLC unit 408. This minimum threshold is set such that the sound card will not run out of data before more can be added through this process 500. For example, the sound card buffer could hold 30 ms of data. The threshold could be set to trigger when less than 10 ms of data remains in the sound card buffer.

Where it is determined in step 512 that the sound card buffer is not below a threshold, the interval timer is reset in step 516 and the process 500 begins over again. In the alternative, if the sound card buffer is below the threshold in step 512, processing continues to step 520 where a data block is requested from the JB & PLC unit 408. The block is formulated from the packets received from the packet network 402. In some cases, the amount of sound in a packet is larger than the block size, while in other cases, the opposite is true. At the time of the request, the jitter buffer may not have a complete block of data received from the packet network 402 as some of the packets may have been lost or not yet received. Where some of the block is still missing, it is recreated by the PLC using any number of algorithms, for example, zero insertion or interpolation. In step 528, the data block is written into the sound card buffer before processing loops through step 516 to the beginning of the process 500.

Figure 6:
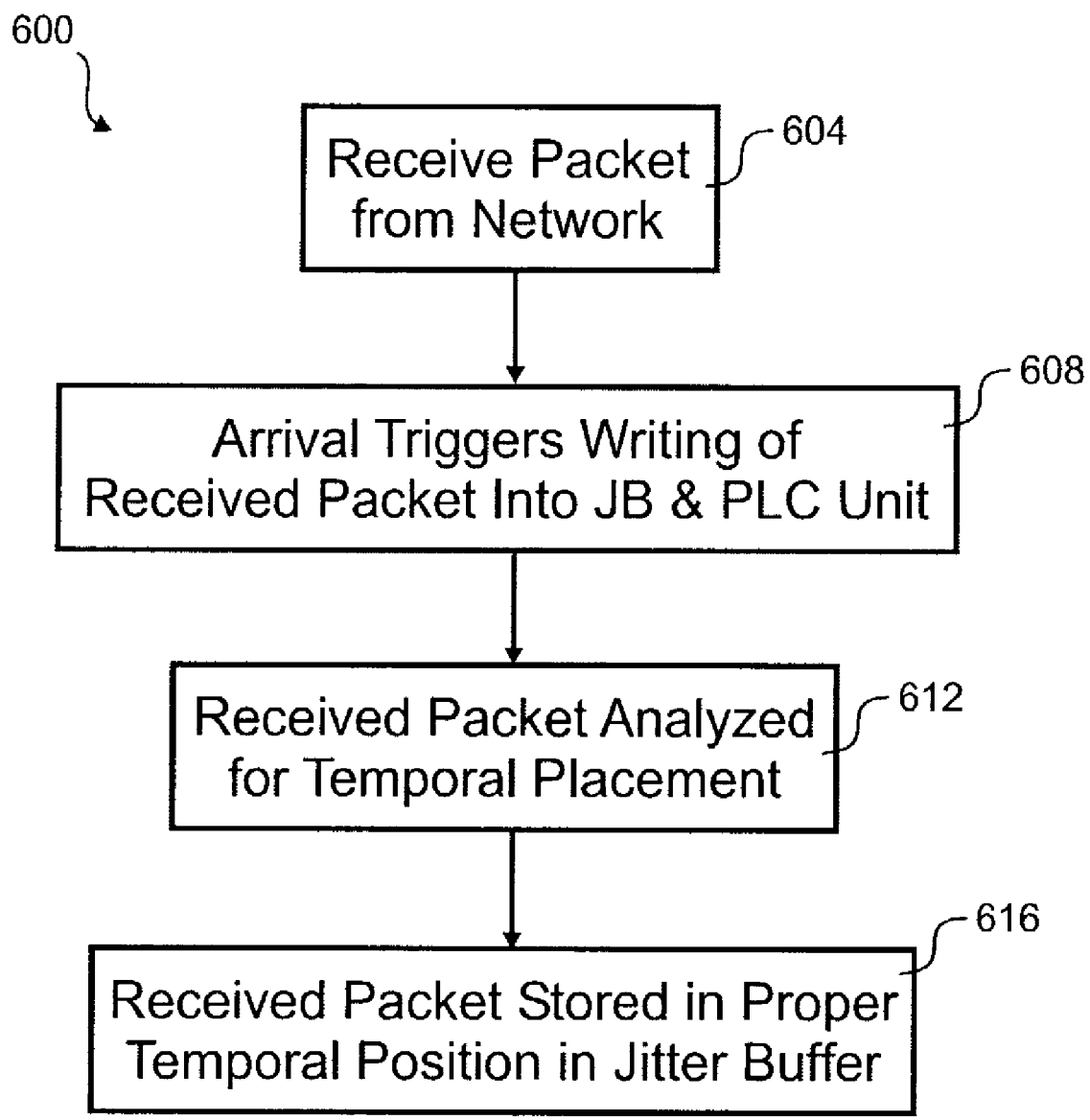
FIG. 6 is a flow diagram of an embodiment of a process for receiving data from a packet network and storing that data in a jitter buffer.

Referring next to FIG. 6, a flow diagram of an embodiment of a process 600 for receiving data from a packet network 402 and storing that data in a jitter buffer is shown. The depicted portion of the process begins in step 604 where a packet is received from the network 402. In this embodiment, the network 402 is the Internet. Arrival at the packet communication device 404 triggers a process in step 608 where the packet is written into the JB & PLC unit 408. The written packet is analyzed to determine its temporal position in the jitter buffer in step 612. In step 616, the packet is stored in the proper position of the jitter buffer. In some embodiments, the jitter buffer may store data out of sequence, but note the temporal positioning of each sequence such that it may be retrieved in proper temporal order.

A number of variations and modifications of the invention can also be used. For example, some of the above embodiments perform some tasks in software. Other embodiments could perform some or all of those tasks in hardware. One possibility is that the process of FIG. 5 is partially implemented in hardware such that the sound card indicates when its buffer needs more data through a hardware or software interrupt to the operating system.

While the principles of the invention have been described above in connection with specific apparatuses and methods, it is to be clearly understood that this description is made only by way of example and not as limitation on the scope of the invention.

What is claimed is:

1. A method for processing an audio media stream that originates from a packet communication network, the method comprising:
   receiving a plurality of packets as they arrive from the packet communication network, wherein the plurality of packets are part of the audio media stream;
   storing the plurality of packets in a jitter buffer;
   monitoring a playout buffer in a media playout device;
   determining that the playout buffer is filled below a threshold;
   retrieving a portion of the audio media stream from the jitter buffer, at least partially in response to the determining step; and
   storing the portion in the playout buffer of the media playout device.

2. The method for processing the audio media stream that originates from the packet communication network as recited in claim 1, wherein the threshold is determined adaptively for a particular computer configuration.

3. The method for processing the audio media stream that originates from the packet communication network as recited in claim 1, wherein the determining step comprises steps of:
   waiting for an interval to occur;
   determining how full the playout buffer is; and
   comparing fill level of the playout buffer to a threshold.

4. The method for processing the audio media stream that originates from the packet communication network as recited in claim 1, further comprising a step of converting the audio media stream from a first format to a second format, wherein the second format is compatible with the media playout device.

5. The method for processing the audio media stream that originates from the packet communication network as recited in claim 4, wherein the first format and second format differ by at least one of a sample rate, a sample bit depth, and an encoding format.

6. The method for processing the audio media stream that originates from the packet communication network as recited in claim 1, further comprising steps of:
   determining which portions of the audio media stream are missing; and
   recreating those missing portions.

7. The method for processing the audio media stream that originates from the packet communication network as recited in claim 6, wherein recreating step is performed after the first-listed determining step.

8. The method for processing the audio media stream that originates from the packet communication network as recited in claim 1, further comprising a step of modifying an amount of data samples produced from the plurality of packets based on a playout sample rate.

9. The method for processing the audio media stream that originates from the packet communication network as recited in claim 1, wherein the media playout device is a computer sound playback sub-system.

10. The method for processing the audio media stream that originates from the packet communication network as recited in claim 1, wherein the method is performed on a handheld computer connected to the packet communication network.

11. The method for processing the audio media stream that originates from the packet communication network as recited in claim 1, wherein the method is performed on a personal computer connected to the packet communication network.

12. The method for processing the audio media stream that originates from the packet communication network as recited in claim 1, wherein the packet communication network uses Internet protocol.

13. A computer system adapted to perform the computer-implementable method for processing the audio media stream that originates from the packet communication network of claim 1.

14. A computer-readable medium having computer-executable instructions for performing the computer-implementable method for processing the audio media stream that originates from the packet communication network of claim 1.

15. An audio playback system coupled to a packet communication network for playing a media stream as that media stream is received, the audio playback system comprising:
   a packet communication device for receiving a plurality of packets from the packet communication network, wherein the plurality of packets are part of the audio media stream;
   a jitter buffer for storing the plurality of packets;
   a media playout device that plays the media stream from a playout buffer; and
   a buffer status monitor that determines when the playout buffer is filled below a threshold before:
      requesting a portion of the media stream from the jitter buffer, and
      storing the portion in the playout buffer.

16. The audio playback system coupled to the packet communication network for playing the media stream as that media stream is received as recited in claim 15, further comprising an interval timer that triggers the buffer status monitor to check the playout buffer.

17. The audio playback system coupled to the packet communication network for playing the media stream as that media stream is received as recited in claim 15, further comprising a sound transducer coupled to the media playout device.

18. The audio playback system coupled to the packet communication network for playing the media stream as that media stream is received as recited in claim 15, further comprising a packet loss concealment unit that reformulates portions of the media stream after those portions are requested by the buffer status monitor.

19. The audio playback system coupled to the packet communication network for playing the media stream as that media stream is received as recited in claim 15, wherein the plurality of packets are arranged in the jitter buffer according to their playback sequence in the media stream.

20. A method for processing a media stream that originates from a packet communication network, the method comprising:
    receiving a plurality of packets as they arrive from the packet communication network, wherein the plurality of packets are part of the media stream;
    storing the plurality of packets in a first buffer;
    monitoring a second buffer used by a media playout device;
    determining that the second buffer is filled below a threshold;
    retrieving a portion of the media stream from the first buffer, at least partially in response to the determining step; and
    storing the portion in the second buffer of the media playout device.

21. The method for processing the media stream that originates from the packet communication network as recited in claim 20, wherein the threshold is adaptively determined.

22. The method for processing the media stream that originates from the packet communication network as recited in claim 20, wherein the plurality of packets are arranged in the first buffer according to their playback sequence in the media stream.

23. The method for processing the media stream that originates from the packet communication network as recited in claim 20, wherein at least some of the media stream is not received from the packet communication device before the retrieving step.

24. The method for processing the media stream that originates from the packet communication network as recited in claim 20, wherein the determining step comprises steps of:
    waiting for an interval to occur;
    determining a fill level of the second buffer; and
    comparing the fill level of the playout buffer to a threshold.

25. The method for processing the media stream that originates from the packet communication network as recited in claim 20, wherein the media stream is a sound stream.

26. The method for processing the media stream that originates from the packet communication network as recited in claim 20, further comprising a step of converting the media stream from a first format to a second format, wherein the second format is compatible with the media playout device.

27. A computer system adapted to perform the computer-implementable method for processing the media stream that originates from the packet communication network of claim 20.

28. A computer-readable medium having computer-executable instructions for performing the computer-implementable method for processing the media stream that originates from the packet communication network of claim 20.

* * * * *